United States Patent
Wright et al.

(10) Patent No.: US 10,381,946 B2
(45) Date of Patent: Aug. 13, 2019

(54) THREE-PHASE TO SINGLE-PHASE CONVERTER MODULE FOR ELECTRICALLY COMMUTATED MOTORS

(71) Applicant: Regal Beloit America, Inc., Beloit, WI (US)

(72) Inventors: Kamron Mark Wright, Fort Wayne, IN (US); Timothy Galligos, Fort Wayne, IN (US); Douglas Lynn Fetters, West Wilson, OH (US); Steven Albert Nardin, Fort Wayne, IN (US)

(73) Assignee: Regal Beloit America, Inc., Beloit, WI (US)

( * ) Notice: Subject to any disclaimer, the term of this patent is extended or adjusted under 35 U.S.C. 154(b) by 0 days.

(21) Appl. No.: 15/894,287

(22) Filed: Feb. 12, 2018

(65) Prior Publication Data

US 2018/0234026 A1    Aug. 16, 2018

Related U.S. Application Data

(60) Provisional application No. 62/457,621, filed on Feb. 10, 2017.

(51) Int. Cl.
| | |
|---|---|
| *H02M 1/32* | (2007.01) |
| *H02M 1/44* | (2007.01) |
| *H02M 7/06* | (2006.01) |
| *F24F 13/00* | (2006.01) |
| *H02P 27/06* | (2006.01) |

(52) U.S. Cl.
CPC ............... *H02M 7/06* (2013.01); *H02M 1/32* (2013.01); *H02M 1/44* (2013.01); *H02M 7/062* (2013.01); *H02P 27/06* (2013.01); *F24F 13/00* (2013.01)

(58) Field of Classification Search
CPC ...... H02P 1/00; H02P 1/46; H02P 3/18; H02P 6/00; H02P 1/24; H02P 1/42; H02P 27/04; H02P 27/06; H02P 23/00; H02P 25/00; H02P 27/00
USPC .......... 318/400.01, 700, 701, 721, 599, 800, 318/801, 727, 799, 432; 363/21.14, 44, 363/52, 56.02, 61, 81
See application file for complete search history.

(56) References Cited

U.S. PATENT DOCUMENTS

| | | | |
|---|---|---|---|
| 4,386,394 A | 5/1983 | Kocher et al. | |
| 4,680,689 A | 7/1987 | Payne | |
| 5,570,279 A | 10/1996 | Venkataramanan | |
| 5,731,969 A | 3/1998 | Small | |
| 5,894,414 A | 4/1999 | Jiang | |
| 5,936,855 A | 8/1999 | Salmon | |
| 7,042,229 B2 * | 5/2006 | Lee ..................... | G01R 31/346 318/478 |

(Continued)

FOREIGN PATENT DOCUMENTS

EP    2278339 B1    11/2011

*Primary Examiner* — Antony M Paul
(74) *Attorney, Agent, or Firm* — Armstrong Teasdale LLP

(57) ABSTRACT

A converter module for converting three-phase electrical power to single-phase electrical power. The converter module includes three-phase terminals and a full-wave bridge rectifier. The three-phase terminals are configured to be electrically coupled to a three-phase power source from which a three-phase power signal is provided. The full-wave bridge rectifier is electrically coupled to the three-phase terminals and configured to rectify the three-phase power signal to a direct current (DC) power signal.

19 Claims, 5 Drawing Sheets

(56) References Cited

U.S. PATENT DOCUMENTS

| | | | |
|---|---|---|---|
| 7,466,089 B2 | 12/2008 | Beifus | |
| 7,599,196 B2 * | 10/2009 | Alexander | H02M 3/1582 |
| | | | 363/13 |
| 8,193,660 B2 * | 6/2012 | Rockenfeller | F25B 49/022 |
| | | | 165/58 |
| 8,294,398 B2 | 10/2012 | Weissbach et al. | |
| 8,773,055 B2 | 7/2014 | Loeeffler et al. | |
| 9,083,274 B2 * | 7/2015 | Liu | H02P 3/22 |
| 9,431,888 B1 * | 8/2016 | Alexander | H02M 5/225 |

* cited by examiner

THREE-PHASE TO SINGLE-PHASE CONVERTER MODULE FOR ELECTRICALLY COMMUTATED MOTORS

RELATED APPLICATIONS

This Application claims the benefit of priority of U.S. Provisional Patent Application No. 62/457,621, titled "Three-Phase to Single-Phase Converter Module for Electrically Commutated Motors," filed on Feb. 10, 2017, which is hereby incorporated herein by reference in its entirety.

BACKGROUND

The field of the disclosure relates generally to single-phase electrically commutated motors (ECMs), and more specifically to a three-phase to single-phase converter module enabling use of a single-phase ECM in three-phase installation.

Known heating, ventilation, and air conditioning (HVAC) systems generally utilize either single-phase electrical power or three-phase electrical power. Three-phase power is more common in commercial and industrial HVAC installations where higher levels of power are necessary and the efficiencies of three-phase power over single-phase power are considerable. Generally, three-phase HVAC systems utilize three-phase ECMs and single-phase HVAC systems utilize single-phase ECMs.

Under certain circumstances, such as, for example, limited parts availability or for small-sized motors, e.g., less than one horsepower, a single-phase ECM may be installed in an otherwise three-phase HVAC system. In such circumstances, the single-phase ECM is connected in a phase-to-phase configuration, or a neutral line is added and the single-phase ECM is connected in a phase-to-neutral configuration. Such configurations require a more complex installation and potential modification to the three-phase HVAC system. Further, such configurations result in imbalanced loads among the phases of the three-phase electrical power.

BRIEF DESCRIPTION

In one aspect, a three-phase to single-phase converter module for converting three-phase electrical power to single-phase electrical power is provided. The converter module includes three-phase terminals and a full-wave bridge rectifier. The three-phase terminals are configured to be electrically coupled to a three-phase power source from which a three-phase power signal is provided. The full-wave bridge rectifier is electrically coupled to the three-phase terminals and configured to rectify the three-phase power signal to a direct current (DC) power signal.

In another aspect, an electrically commutated motor (ECM) is provided. The ECM includes a first housing and a second housing. The first housing is configured to contain a rectifier circuit configured to rectify a single-phase alternating current (AC) power signal to a low-quality direct current (DC) power signal. The first housing is further configured to contain a DC filter capacitor electrically coupled to the rectifier circuit and configured to convert the low-quality DC power signal to a high-quality DC power signal. The first housing is further configured to contain a motor controller electrically coupled to the DC filter capacitor and configured to receive the high-quality DC power signal. The second housing is disposed external to the first housing. The second housing is configured to contain a converter module. The converter module includes a full-wave bridge rectifier configured to be electrically coupled to a three-phase power source from which a three-phase power signal is provided. The full-wave bridge rectifier is further configured to rectify the three-phase power signal to a DC power signal that is provided to an input of the rectifier circuit.

In another aspect, a converter module is provided for converting three-phase electrical power to single-phase electrical power for powering a single-phase electrically commutated motor (ECM). The converter module includes three-phase terminals configured to be electrically coupled to a three-phase power source from which a three-phase power signal is provided. The converter module also includes a full-wave bridge rectifier electrically coupled to the three-phase terminals and configured to rectify the three-phase power signal to a direct current (DC) power signal.

In another aspect, a method of operating a converter module to convert three-phase electrical power to single-phase electrical power to power a single-phase electrically commutated motor (ECM) is provided. The method includes receiving a three-phase power signal at three-phase terminals of the converter module. The method includes rectifying the three-phase power signal to a direct current (DC) power signal using a full-wave bridge rectifier. The method includes supplying the DC power signal to a rectifier stage of the single-phase ECM to power the ECM.

In yet another aspect, an ECM is provided. The ECM includes a stator having windings, and a rotor electromagnetically coupled to the stator and configured to rotate relative thereto. The ECM includes a rectifier circuit, a DC filter capacitor, and a motor controller all disposed within a first housing with the stator and the rotor. The rectifier circuit is configured to rectify a low-quality direct current (DC) power signal to a high-quality DC power signal. The DC filter capacitor coupled to the rectifier circuit and is configured to smooth-filter the high-quality DC power signal. The motor controller is coupled to the DC filter capacitor and is configured to receive the high-quality DC power signal, invert the high-quality DC power signal to an AC power signal, and energize the windings of the stator using the AC power signal to control operation of the ECM. The ECM further includes a second housing disposed external to the first housing. The second housing is configured to contain a converter module. The converter module includes a full-wave bridge rectifier configured to be electrically coupled to a three-phase power source from which a three-phase power signal is provided, and further configured to rectify the three-phase power signal to the low-quality DC power signal that is supplied to an input of the rectifier circuit.

DETAILED DESCRIPTION

As used herein, an element or step recited in the singular and preceded with the word "a" or "an" should be understood as not excluding plural elements or steps, unless such exclusion is explicitly recited. Furthermore, references to "example implementation" or "one implementation" of the present disclosure are not intended to be interpreted as excluding the existence of additional implementations that also incorporate the recited features.

Single-phase ECMs typically include a rectification stage to convert a single-phase alternating current (AC) power signal to direct current (DC) power that is supplied to an ECM controller that operates the ECM. It is realized herein that addition of a three-phase to single-phase converter module external to the single-phase ECM would enable installation of the single-phase ECM in an otherwise three-phase HVAC system, and would avoid the various disadvantages of available adaptations of single-phase ECMs to three-phase installations. It is realized herein such a converter module avoids imbalance among the three phases and further insulates the single-phase ECM against loss of a given phase of the three-phase power. It is realized herein such a converter module renders unnecessary the modification or addition of a neutral line in the three-phase HVAC system.

It is further realized herein the existing ECM rectification stage can be utilized in combination with the three-phase to single-phase converter module described herein. More specifically, such a converter module may produce a DC signal with significant ripple and utilize the existing ECM rectification stage to filter the DC signal to remove the ripple and produce a high-quality DC power signal for the ECM controller. Conversely, a typical three-phase rectification package includes, for example, DC filter capacitances to produce such a high-quality DC power signal. The three-phase to single-phase converter module described herein omits such components, enabling such a converter module to be less complex, smaller, and less redundant to the single-phase ECM itself.

It is further realized herein, in certain embodiments, the three-phase to single-phase converter module may include a transient voltage protection circuit and an electromagnetic interference (EMI) filtering circuit to improve performance of the converter module.

Figure 1:
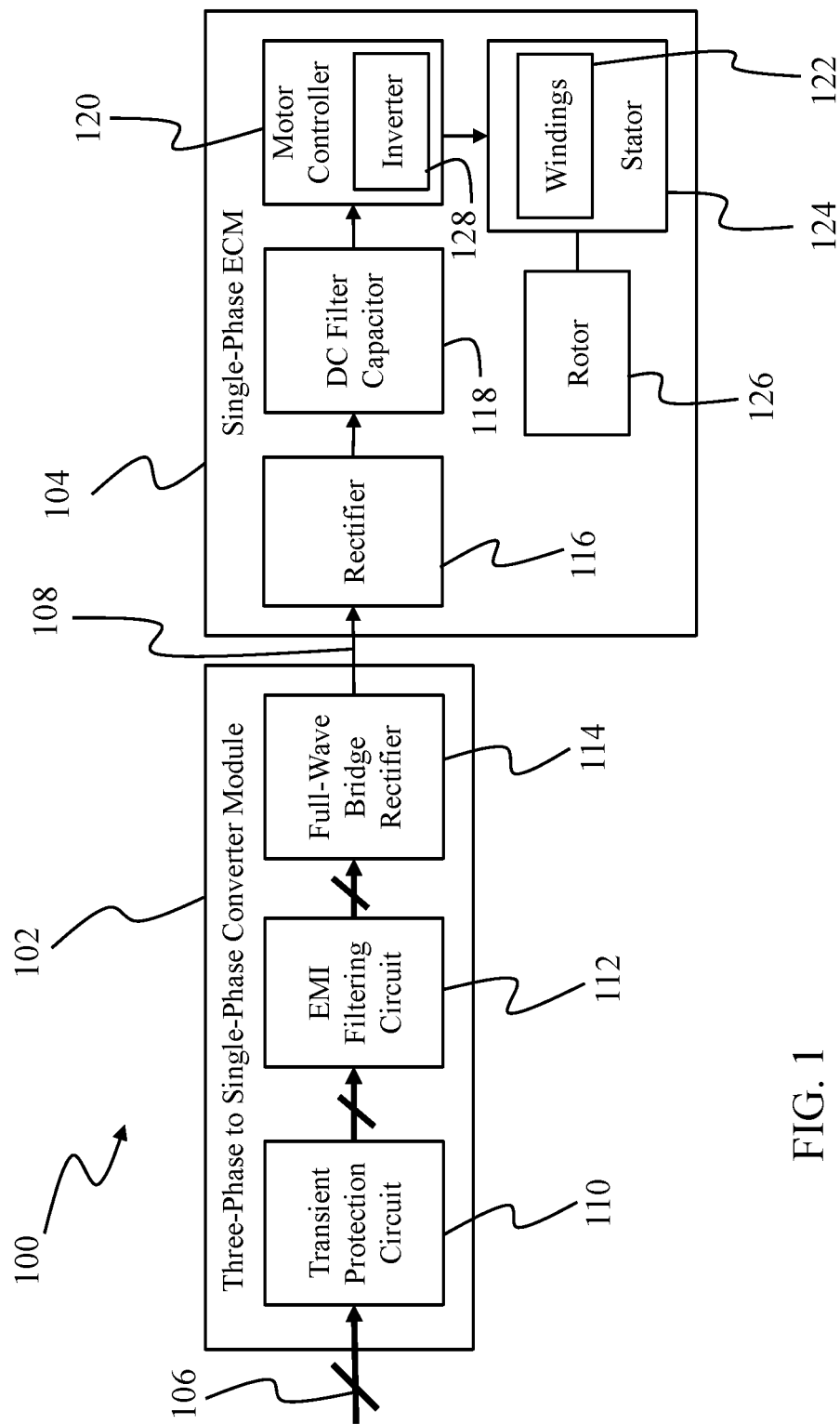
FIG. 1 is a block diagram of an exemplary HVAC system.

FIG. 1 is a block diagram of an exemplary HVAC system 100, including a three-phase to single-phase converter module 102, i.e., converter module 102, and a single-phase ECM 104. Converter module 102 is contained within one housing, while single-phase ECM 104 is contained within another housing. Converter module 102 and its housing are disposed external to the housing of single-phase ECM 104. A three-phase AC power signal 106 is input to converter module 102 and a low-quality DC power signal 108 is output and supplied to single-phase ECM 104.

Converter module 102 includes a transient protection circuit 110, an EMI filtering circuit 112, and a full-wave bridge rectifier 114. Transient protection circuit 110 provides protection to HVAC system 100 against transient voltages. EMI filtering circuit 112 reduces EMI that presents in DC power signal 108. Full-wave bridge rectifier 114 rectifies three-phase AC power signal 106 to low-quality DC power signal 108. Quality of a given DC power signal refers to the extent the given DC power signal retains AC components, otherwise referred to as ripple. A high-quality DC power signal would exhibit no ripple, while a lower quality DC power signal exhibits some amount of ripple.

Single-phase ECM 104 includes a rectifier 116, a DC filter capacitor 118, and a motor controller 120. Rectifier 116 is a single-phase rectifier circuit for converting a single AC phase to a DC signal. DC filter capacitor 118 reduces ripple in the DC signal produced by rectifier 116. Motor controller 120 regulates power to the windings 122 of a stator 124 of single-phase ECM 104 to operate single-phase ECM 104. A rotor 126 is electromagnetically coupled to stator 124 and configured to rotate relative thereto. In some embodiments, DC filter capacitor 118 supplies a DC voltage (e.g., a high-quality DC power signal) to an inverter 128 of motor controller 120. Inverter 128 converts the DC voltage supplied across DC filter capacitor 118 (e.g., the high-quality DC power signal) to an AC signal that energizes windings 122 of stator 124 to control operation of single-phase ECM 104.

Figure 2:
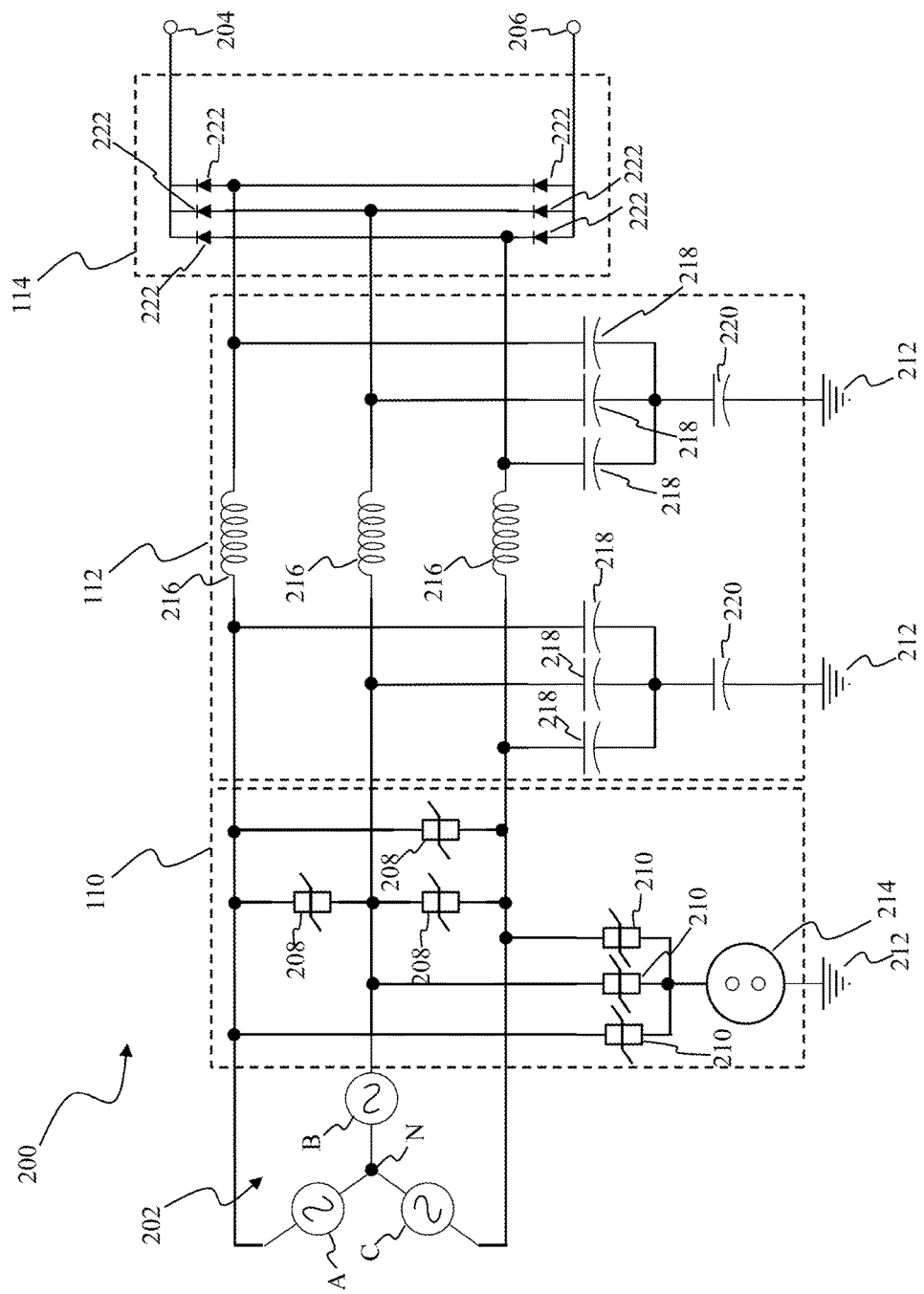
FIG. 2 is a schematic diagram of an exemplary converter module for use in the HVAC system shown in FIG. 1.

FIG. 2 is a schematic diagram of an exemplary three-phase to single-phase converter module 200 for use in HVAC system 100, shown in FIG. 1. Converter module 200 includes transient protection circuit 110, EMI filtering circuit 112, and full-wave bridge rectifier 114, also shown in FIG. 1. Converter module 200 is supplied three-phase electrical power from a three-phase power source 202, such as, for example, a utility grid or diesel generator, or DC sources such as a solar array, wind generator, or battery in combination with one or more DC/AC converters. Three-phase power source 202 includes three phases A, B, C, and a neutral line, N. Converter module 200 includes a line output terminal 204 and a neutral output terminal 206.

Transient protection circuit 110 includes metal-oxide varistors (MOVs) 208 coupled between each pair of phases A, B, and C in a line-to-line configuration. Transient protection circuit 110 includes MOVs 210 coupled between phases A, B, and C and an Earth ground 212. MOVs 210 are further coupled to Earth ground 212 through a spark gap 214.

EMI filtering circuit 112 includes series-coupled common mode chokes 216 coupled to each of phases A, B, and C. EMI filtering circuit 112 includes two sets of capacitors 218 respectively coupled between phases A, B, and C and Earth ground 212 through a capacitor 220.

Full-wave bridge rectifier 114 includes diodes 222 configured in a full-bridge configuration and coupled to each of phases A, B, and C. The output of full-wave bridge rectifier 114 is coupled to line output terminal 204 of converter module 200 and to neutral output terminal 206 of converter module 200.

Figure 3:
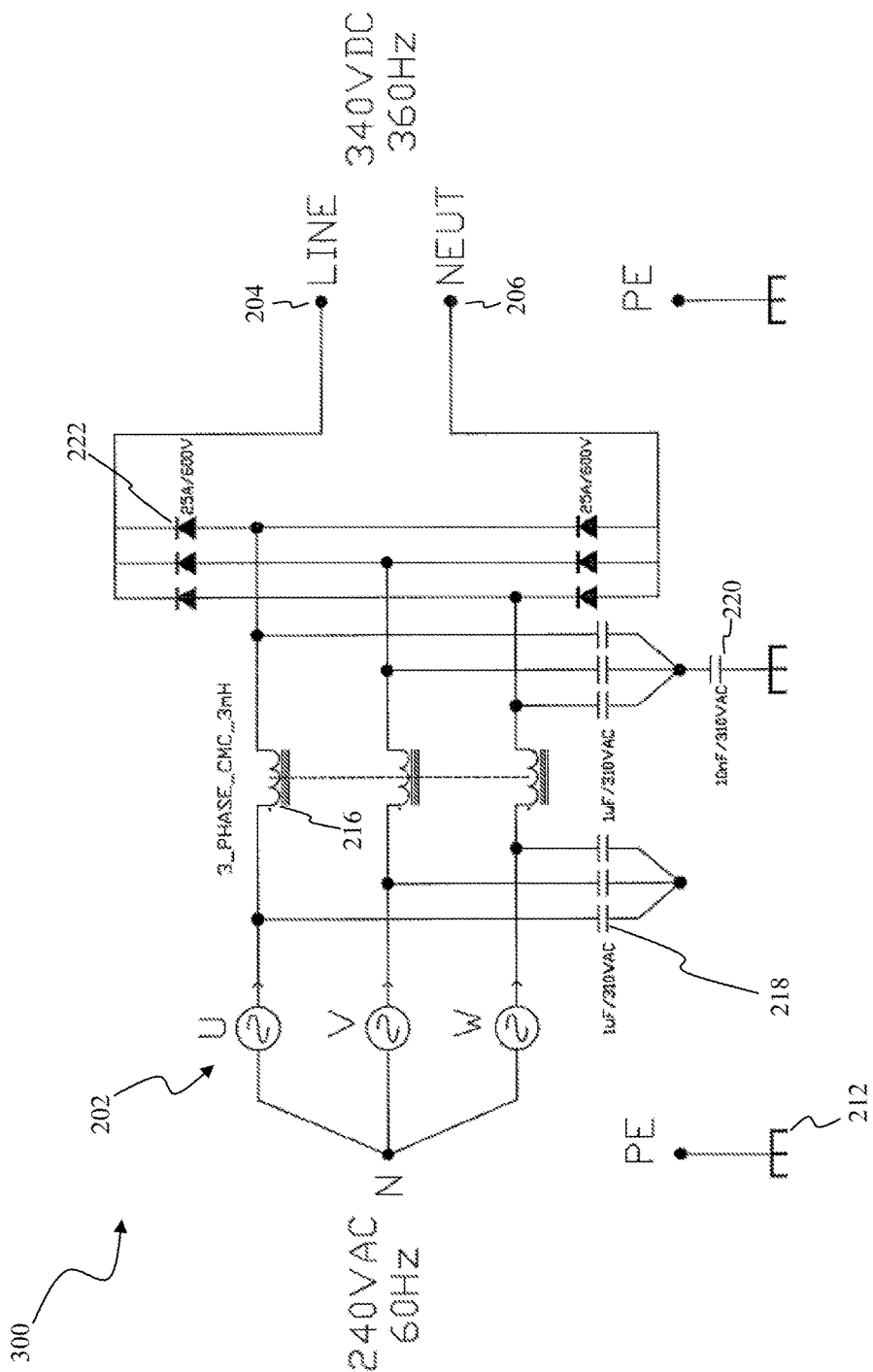
FIG. 3 is a schematic diagram of another exemplary converter module for use in the HVAC system shown in FIG. 1.

FIG. 3 is a schematic diagram of another exemplary three-phase to single-phase converter module 300, including three-phase power source 202, line output terminal 204, neutral output terminal 206, Earth ground 212, common mode chokes 216, capacitors 218, capacitor 220, and diodes 222.

In the embodiment of FIG. 3, converter module 300 is supplied a 240 Volt AC, 60 Hertz power signal, including phases U, V, and W, and neutral N. Common mode chokes 216 include 3 milliHenry inductors. Capacitors 218 are 1 microFarad capacitors rated for 310 Volts AC. Capacitors 220 are 10 nanoFarad capacitors rated for 310 Volts AC. Diodes 222 are rated for 25 Amperes and 600 Volts. Converter module 300 provides 340 Volts DC, 360 Hertz signal on line terminal 204. The 360 Hertz signal produced is a low-quality DC signal, i.e., having a non-zero frequency.

Figure 4A:
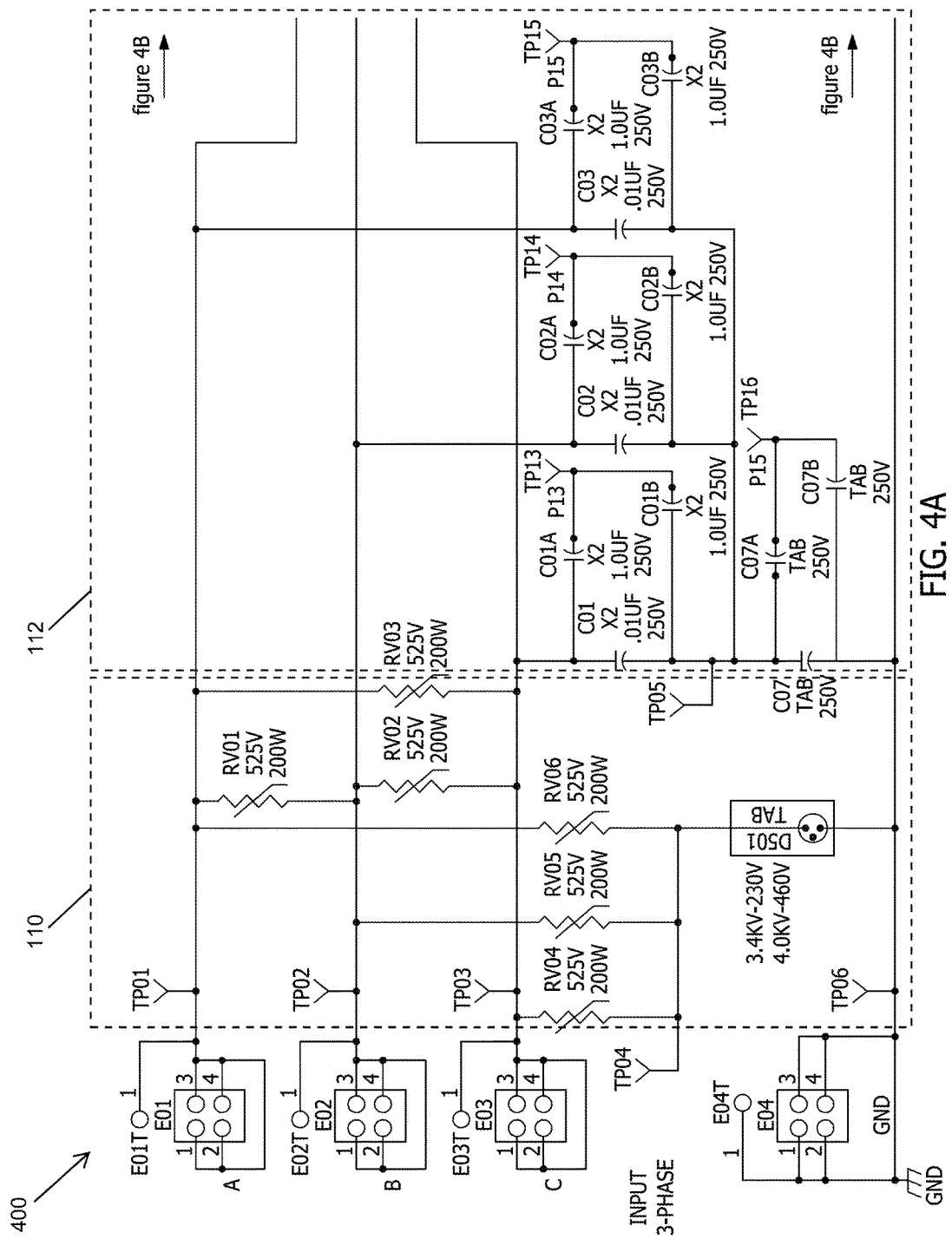
FIG. 4A and FIG. 4B together are a schematic diagram of yet another exemplary converter module for use in the HVAC system shown in FIG. 1.
Figure 4B:
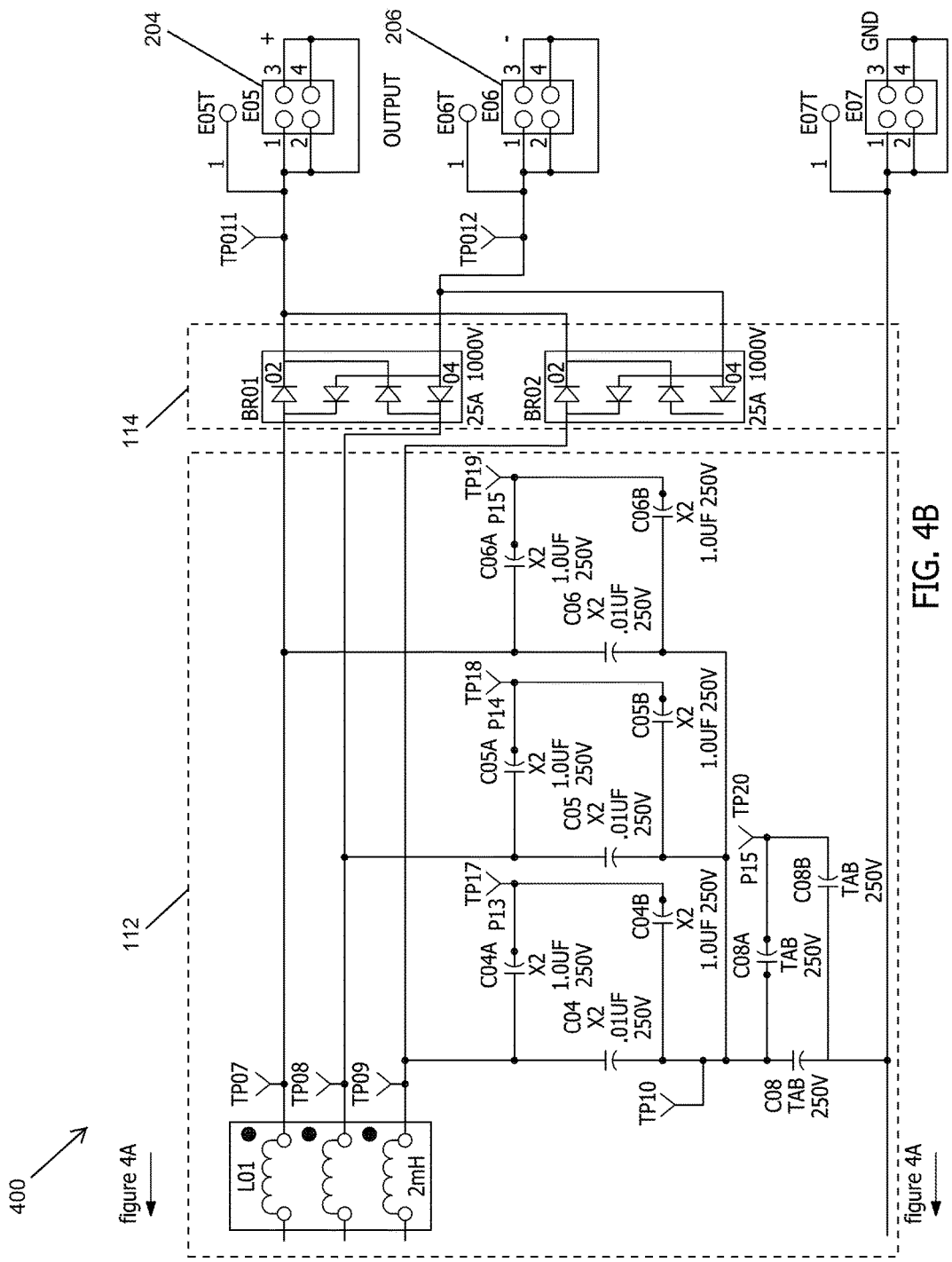

FIG. 4A and FIG. 4B together are a schematic diagram of another exemplary three-phase to single-phase converter module 400, including three-phase power source 202, line output terminal 204, neutral output terminal 206, transient protection circuit 110, EMI filtering circuit 112, and full-wave bridge rectifier 114.

The methods and systems described herein may be implemented using computer programming or engineering techniques including computer software, firmware, hardware or any combination or subset thereof, wherein the technical effect may include at least one of: (a) enabling installation of a single-phase ECM in an otherwise three-phase HVAC system; (b) reducing complexity of installation of a single-phase ECM in an otherwise three-phase HVAC system; (c) balancing of phases in a three-phase power source; and (d) insulating a single-phase ECM installed in a three-phase HVAC system from a loss of one phase of the three-phase power source.

It is realized herein that addition of a three-phase to single-phase converter module external to the single-phase ECM would enable installation of the single-phase ECM in an otherwise three-phase HVAC system, and would avoid the various disadvantages of available adaptations of single-phase ECMs to three-phase installations. It is realized herein such a converter module avoids imbalance among the three phases and further insulates the single-phase ECM against loss of a given phase of the three-phase power. It is realized herein such a converter module renders unnecessary the modification or addition of a neutral line in the three-phase HVAC system.

Some embodiments involve the use of one or more electronic or computing devices. Such devices typically include a processor, processing device, or controller, such as a general purpose central processing unit (CPU), a graphics processing unit (GPU), a microcontroller, a reduced instruction set computer (RISC) processor, an application specific integrated circuit (ASIC), a programmable logic circuit (PLC), a field programmable gate array (FPGA), a digital signal processing (DSP) device, and/or any other circuit or processing device capable of executing the functions described herein. The methods described herein may be encoded as executable instructions embodied in a computer readable medium, including, without limitation, a storage device and/or a memory device. Such instructions, when executed by a processing device, cause the processing device to perform at least a portion of the methods described herein. The above examples are exemplary only, and thus are not intended to limit in any way the definition and/or meaning of the terms processor, processing device, and controller.

In the embodiments described herein, memory may include, but is not limited to, a computer-readable medium, such as a random access memory (RAM), and a computer-readable non-volatile medium, such as flash memory. Alternatively, a floppy disk, a compact disc-read only memory (CD-ROM), a magneto-optical disk (MOD), and/or a digital versatile disc (DVD) may also be used. Also, in the embodiments described herein, additional input channels may be, but are not limited to, computer peripherals associated with an operator interface such as a mouse and a keyboard. Alternatively, other computer peripherals may also be used that may include, for example, but not be limited to, a scanner. Furthermore, in the exemplary embodiment, additional output channels may include, but not be limited to, an operator interface monitor.

As used herein, the terms "software" and "firmware" are interchangeable, and include any computer program stored in memory for execution by a processor, including RAM memory, ROM memory, EPROM memory, EEPROM memory, and non-volatile RAM (NVRAIVI) memory. The above memory types are examples only, and are thus not limiting as to the types of memory usable for storage of a computer program.

The systems and methods described herein are not limited to the specific embodiments described herein, but rather, components of the systems and/or steps of the methods may be utilized independently and separately from other components and/or steps described herein.

This written description uses examples to provide details on the disclosure, including the best mode, and also to enable any person skilled in the art to practice the disclosure, including making and using any devices or systems and performing any incorporated methods. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A converter module for converting three-phase electrical power to single-phase electrical power for powering a single-phase electrically commutated motor (ECM), said converter module comprising:
    three-phase terminals configured to be electrically coupled to a three-phase power source from which a three-phase power signal is provided;
    a full-wave bridge rectifier electrically coupled to said three-phase terminals and configured to rectify the three-phase power signal to a direct current (DC) power signal;
    a line output terminal and a neutral output terminal, wherein each of the line output terminal and the neutral output terminal is configured to be electrically coupled to the single-phase ECM.

2. The converter module of claim 1 further comprising an electromagnetic interference (EMI) filtering circuit coupled between said three-phase terminals and said full-wave bridge rectifier.

3. The converter module of claim 1 further comprising a transient protection circuit coupled between said three-phase terminals and said full-wave bridge rectifier.

4. The converter module of claim 3 further comprising an electromagnetic interference (EMI) filtering circuit coupled between said transient protection circuit and said full-wave bridge rectifier.

5. The converter module of claim 1 further comprising a housing within which said three-phase terminals and said full-wave bridge rectifier are disposed.

6. The converter module of claim 5, wherein said housing is external to the single-phase ECM.

7. A method of operating a converter module to convert three-phase electrical power to single-phase electrical power to power a single-phase electrically commutated motor (ECM), said method comprising:
    receiving a three-phase power signal at three-phase terminals of the converter module;
    rectifying the three-phase power signal to a direct current (DC) power signal using a full-wave bridge rectifier; and
    supplying the DC power signal to a rectifier stage of the single-phase ECM to power the ECM.

8. The method of claim 7 further comprising filtering the three-phase power signal using an electromagnetic interference (EMI) filtering circuit.

9. The method of claim 7 further comprising filtering transient voltages from the three-phase power signal using a transient protection circuit.

10. The method of claim 7 further comprising rectifying, by the rectifier stage of the single-phase ECM, the DC power signal to a high-quality DC signal.

11. The method of claim 10 further comprising charging a DC filter capacitor of the single-phase ECM using the high-quality DC signal.

12. The method of claim 11 further comprising supplying a DC voltage across the DC filter capacitor to an inverter of the single-phase ECM.

13. The method of claim 12 further comprising converting, by the inverter of the single-phase ECM, the DC voltage across the DC filter capacitor to an alternating current (AC) signal that energizes windings of a stator of the single-phase ECM to control operation of the single-phase ECM.

14. An electrically commutated motor (ECM), comprising:
   a stator comprising windings;
   a rotor electromagnetically coupled to said stator and configured to rotate relative thereto;
   a rectifier circuit configured to rectify a low-quality direct current (DC) power signal to a high-quality DC power signal;
   a DC filter capacitor coupled to said rectifier circuit and configured to smooth-filter the high-quality DC power signal;
   a motor controller coupled to said DC filter capacitor and configured to:
      receive the high-quality DC power signal;
      invert the high-quality DC power signal to an AC power signal; and
      energize said windings of said stator using the AC power signal to control operation of the ECM;
   first housing within which said stator, said rotor, said rectifier circuit, said DC filter capacitor, and said motor controller are disposed; and
   a second housing disposed external to said first housing, said second housing configured to contain a converter module, said converter module comprising:
      a full-wave bridge rectifier configured to be electrically coupled to a three-phase power source from which a three-phase power signal is provided, and further configured to rectify the three-phase power signal to the low-quality DC power signal that is supplied to an input of said rectifier circuit.

15. The ECM of claim 14, wherein said converter module further comprises an electromagnetic interference (EMI) filtering circuit coupled between three-phase terminals to which the three-phase power source is coupled and said full-wave bridge rectifier.

16. The ECM of claim 14, wherein said converter module further comprises a transient protection circuit coupled between three-phase terminals to which the three-phase power source is coupled and said full-wave bridge rectifier.

17. The ECM of claim 16, wherein said converter module further comprises an electromagnetic interference (EMI) filtering circuit coupled between said transient protection circuit and said full-wave bridge rectifier.

18. The ECM of claim 14, wherein said converter module further comprises a line output terminal and a neutral output terminal through which the low-quality DC power signal is supplied to the rectifier circuit.

19. The ECM of claim 18, wherein said converter module further comprises three-phase terminals configured to be coupled to respective phases of the three-phase power source, and through which the three-phase power signal is supplied, without a neutral line, to said full-wave bridge rectifier.

* * * * *